(12) United States Patent
Caruba et al.

(10) Patent No.: US 8,076,646 B2
(45) Date of Patent: Dec. 13, 2011

(54) BURST-MODE READOUT FOR SOLID STATE RADIATION DETECTORS USING PARTITIONED PIPELINE ARCHITECTURE

(75) Inventors: James Frank Caruba, Bartlett, IL (US); John C. Engdahl, Peoria, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1490 days.

(21) Appl. No.: 11/165,937

(22) Filed: Jun. 24, 2005

(65) Prior Publication Data

US 2007/0029494 A1    Feb. 8, 2007

Related U.S. Application Data

(60) Provisional application No. 60/583,803, filed on Jun. 28, 2004.

(51) Int. Cl.
*G01T 1/20*         (2006.01)
(52) U.S. Cl. .................................. 250/370.11
(58) Field of Classification Search ............... 250/370.11
See application file for complete search history.

(56) References Cited

U.S. PATENT DOCUMENTS

| | | | | |
|---|---|---|---|---|
| 4,767,929 A * | 8/1988 | Valentine | ................. | 250/370.07 |
| 4,769,755 A * | 9/1988 | Yamakawa | ................. | 250/369 |
| 5,323,006 A * | 6/1994 | Thompson et al. | ....... | 250/363.02 |
| 6,303,943 B1 * | 10/2001 | Yu et al. | ......................... | 257/40 |
| 2002/0145115 A1 * | 10/2002 | Nygard et al. | ........... | 250/370.09 |
| 2003/0105397 A1 * | 6/2003 | Tumer et al. | ................... | 600/436 |

* cited by examiner

*Primary Examiner* — David Porta
*Assistant Examiner* — Shun Lee
(74) *Attorney, Agent, or Firm* — Peter Kendall

(57) ABSTRACT

A partitioned pipeline read-out circuit architecture eliminates real-time constraints from off-chip read-out control electronics in a solid-state radiation detector system, so that an efficient decoupled architecture is possible. The front-end electronics includes a multi-channel ASIC with independently triggered charge sensitive pre-amplifiers, shaper circuits, and switched sample-and-hold capacitor circuits for each photodiode or pixel of the detector module. With this structure, individual photodiodes of the photodetector array can detect and store scintillation events independently and randomly. The ASIC is interfaced to an external successive approximation A/D converter for conversion and subsequent input to a data processing apparatus.

20 Claims, 4 Drawing Sheets

BURST-MODE READOUT FOR SOLID STATE RADIATION DETECTORS USING PARTITIONED PIPELINE ARCHITECTURE

BACKGROUND OF THE INVENTION

1. Field of the Invention

The present invention relates generally to radiation detectors in nuclear medicine and more specifically to the electronics used to detect signals from solid state photosensors used in some radiation detectors.

2. Description of the Background Art

Nuclear medicine imaging is sensitive to the radionuclide distribution within a patient after the in vivo administration of radiopharmaceuticals to acquire images that are used to assess the function and anatomy of organs, bones or tissues of the body. The imaging systems that detect the radionuclide distribution comprise radiation detectors and associated electronics. The imaging systems detect x-ray or gamma ray photons derived from the administered radionuclides. Single photon emission imaging and coincidence imaging are two forms of nuclear medicine imaging that are currently in common use. In single photon emission imaging, the radionuclide itself directly emits the radiation to be detected. For example, in Single Photon Emission Computed Tomography (SPECT), gamma-emitting radionuclides such as $^{99}$Tc, $^{123}$I, $^{67}$Ga and $^{111}$In may be part of the administered radiopharmaceutical. The imaging system may use a lead collimator to eliminate all photons but those photons perpendicular to the surface of the detector. The location and energy of emitted photons may then be accumulated until a satisfactory image is obtained. Coincidence imaging eliminates the need for such a collimator by relying on the detection of two photons at different detectors at nearly the same time. An example of coincidence imaging in current clinical use is Positron Emission Tomography (PET). In PET, $\beta^+$-emitting radionuclides such as $^{11}$C, $^{13}$N, $^{15}$O, $^{18}$F, $^{68}$Ga, $^{82}$Rb are part of the administered radiopharmaceutical. The emitted positrons react with electrons within the patient's body, the annihilation creating two 511 keV photons emitted in opposite directions. The two photons are then detected within a certain time window, generally in the nanosecond range, of each other. Radiation detectors for nuclear medicine imaging may need to detect photons from 1 keV to several MeV in energy.

Many radiation detectors in current use in nuclear medicine imaging systems consist of a scintillation crystal, or scintillator, for converting x-ray or gamma ray photons into visible light photons, so called scintillation photons, and a device for converting the scintillation photons into electrical signals. The Anger camera pioneered this approach in the 1950s and is more fully described in U.S. Pat. No. 3,011,057. The Anger camera consists of a NaI crystal and an array of photomultiplier tubes (PMTs). In operation, gamma ray photons cause scintillation photons to be emitted from the NaI crystal. The scintillator photons then impinge the different PMTs. The PMTs convert the detected light photons into electrical signals, which are amplified and inputted to a location and energy computing circuit, which yields information about the location and energy of the scintillation event within the NaI crystal.

Regardless of the scintillator, the scintillation photons produced must be converted into an electrical signal to be analyzed. A PMT is a vacuum tube including a photocathode, and an electron multiplier sealed into an evacuated glass tube, and an input window which is optically coupled to the scintillation crystal. Scintillation photons (4 or 5) incident on the photocathode cause the photocathode to emit an electron. The electron is absorbed by a dynode which emits 5-6 electrons. A series of dynodes repeat this reaction until a final large cluster of electrons is fed through the anode as a pulse to the attached logic circuits to determine position.

PMTs are extremely sensitive to low levels of light. However, PMTs have many drawbacks. PMTs require a high voltage for operation, typically greater than 1000V. PMTs are vulnerable to drifting in performance, especially early in their life cycle. PMTs are susceptible to mechanical failure and may thus be less reliable. PMTs are susceptible to magnetic fields, such as from the MRI devices (and even from the earth's comparatively weak magnetic field). PMTs are physically bulky. The size of the PMTs determines and limits the intrinsic spatial resolution of a detector system. Furthermore, PMTs require lead shielding, thus increasing the weight of the overall camera. This increases costs, especially in the case the camera must be moved by motors for tomographic imaging.

In addressing the above problems, photodetectors composed of an array of solid state photodiodes have been used rather than PMTs. See, for example, U.S. Pat. No. 5,171,998, incorporated by reference herein in its entirety. Inorganic photodiodes, generally various forms or compounds of silicon, address some of the problems of the PMTs. The inorganic photodiodes are more stable over their life cycle, more robust mechanically, not susceptible to magnetic fields, and much smaller and lighter. However, inorganic photodiodes are expensive, difficult, and slow to fabricate. Their mechanical structure is rigid. Inorganic photodiodes are susceptible to radiation damage. Inorganic photodiodes generally have a poor spectral response to long wavelength scintillation photons from certain scintillation crystals, such as CsI. Finally, the low band gap of silicon based photodiodes yields thermally generated leakage current, which acts as noise in associated circuits which read the signal from the inorganic photodiodes. The silicon photodiodes must be cooled to lower such leakage current to acceptable levels.

The use of carbon-based photodiodes in lieu of inorganic photodiodes has been disclosed. Using an array of carbon-based photodiodes in a photodetector has many advantages. One such advantage is a substantially lower leakage current (or "dark" current) than found in current inorganic photodiodes. Such substantially lower leakage current is due to the higher band gap seen in carbon-based photodiodes. However, the capacitance of such photodiodes is substantially increased.

Front-end electronics optimized for silicon photodiode detectors are designed to minimize noise and thus maximize energy resolution. Such front-end electronics thus cannot take advantage of the lower noise of the carbon-based photodiode and cannot realize the increase in energy yield due to the reduced noise from the leakage current. Front-end electronics that take advantage of the different electrical characteristics of low leakage current photodiodes, such as carbon-based photodiodes, have been proposed.

In particular, front-end electronics that use a number of shaper circuits with relatively long shaping or integration times have been proposed for use with low leakage current photodiodes.

FIG. 1 shows an example of such electronics. A radiation detector 2 includes a radiation detector module 4 and associated electronics 6. The radiation detector module 4 has a scintillator 8 and an array of photodiodes 10 (composed of individual photodiodes 12) optically coupled to the scintillator 8. The array of photodiodes 10 is electrically coupled to associated electronics 6. The associated electronics 6 include the front-end electronics 14 and the read-out electronics 16. The read-out electronics 16 is in communication with a processing apparatus such as computer 28. The front-end electronics 14 typically includes a preamplifier 20 for boosting the low output current of photodiode array 10. A shaper circuit 22 is coupled to the preamplifier circuit 20. The read-out electronics 16 includes a sample/hold circuit 24 for holding the shaped signal output from shaper circuit 22. Each individual photodiode 12 of photodiode array 10 represents a pixel of the image, and thus requires its own set of preamplifier, shaper, and sample/hold circuits that are the same as shown in FIG. 1. The sample/hold circuit 24 is triggered to send the held signal to multiplexer 26, which sorts signals from the multiple pixels of the array of photodiodes 10. The signal from the multiplexer 26 is then communicated to computer 28 or other logic circuits for computation of event location and energy as well as other calculations.

When an x-ray or gamma ray is absorbed within the scintillator 8, scintillation photons in the visible spectrum are generated. The scintillation photons which impinge a pixel 12 of the photodiode array 10 generate a current. The current is amplified by the preamplifier 20, and then integrated over a shaping time ($t_s$) (also known as the "shaper peaking time" or "integration time") by the shaper circuit 22. The resulting signal is a shaped pulse with peak amplitude related to the amount of charge accumulated over the integration time $t_s$.

The duration of the current from the photodiode 12 depends on the detector decay time, which is an intrinsic detector property. This time is equivalent to the collection time ($t_c$) of the current. However, making the integration time $t_s$ equal to the collection time $t_c$ is not sufficient to maximize the amount of signal collected from the current and converted into the pulse output of the shaper 22, due to the phenomenon of ballistic deficit. FIG. 2 shows the ballistic deficit for a CsI(Tl)/photodiode detector. In this model, the shaper circuit is assumed to be of the first order. The detector decay time is assumed to be 1 μs. A shaping time $t_s$ equal to the collection time $t_c$ will yield a peak approximately equal to only one third of the signal received. In general, the shaping time should be at least five times larger than the collection time ($t_s \geq 5\, t_c$) in order for the peak of the resulting shaped pulse to be in proportion to the energy of the absorbed photon collected over the collection time.

Thus, when lower leakage current (and higher capacitance) photosensors such as carbon-based photodiodes are used as the radiation detectors, several changes occur in the relevant electrical characteristics of the detector 4, which require changes in the front-end electronics 14 in order to minimize noise.

The thermal noise, which arises from the leakage (or dark) current, can be modeled as a parallel noise source. The "shot" noise, which is dependent on the detector capacitance, can be modeled as a series noise source. The increase in detector capacitance creates more series noise in the detector 4, but the decrease in dark current decreases the amount of parallel noise in detector 4. An analysis of the energy resolution versus shaping time as shown in FIG. 3 demonstrates that increasing the shaping time will yield an improved energy resolution.

According to the electronics of FIG. 1, either a trigger circuit is used to simultaneously trigger all the shaper circuits connected to the array of photodiodes, or the shaping circuits may be clocked at a high sample time $t_s$ such as 100 μs. This operation is based on the theory that the longer shaping time reduces the chance that a current pulse will not be fully integrated.

However, use of this method requires that the signals held in the sample/hold circuits 24 also be read out simultaneously. In other words, events are read out as they occur in time, one at a time, for the entire circuit. Such operation places a limitation on the maximum count rate obtainable by the system, as new event detection must be disabled during readout.

SUMMARY OF THE INVENTION

The present invention provides an improvement to the front-end electronics used with low leakage current, high capacitance photosensors such as carbon-based photodiodes. According to the present invention, a decoupled pipeline architecture is provided for the front-end electronics of solid-state pixilated radiation detectors, which enables events to be detected and accumulated independently, thereby increasing the maximum count rate of the detector system.

According to one aspect, the invention provides a radiation detector system including a gantry, a radiation detector head mounted on the gantry, the radiation detector head including a scintillator and at least one solid-state photodetector coupled to detect photon emissions from the scintillator, and associated electronic circuit for processing a signal outputted from the photodetector, the electronic circuit including a shaper circuit that receives the output signal from the photodetector and integrates the output signal for a predetermined amount of time to produce an integrated signal, a switched sample/hold circuit that receives a sample of the integrated signal, and a trigger circuit that triggers a switch of the sample/hold circuit to receive the integrated signal when the output signal from the photodetector exceeds a predetermined threshold, an A/D converter that receives sample signals from the switched sample/hold circuit and converts such signals to digital data, and a data processing system that receives the digital data and processes it to construct radiological images of a radiation distribution detected by the radiation detector head.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
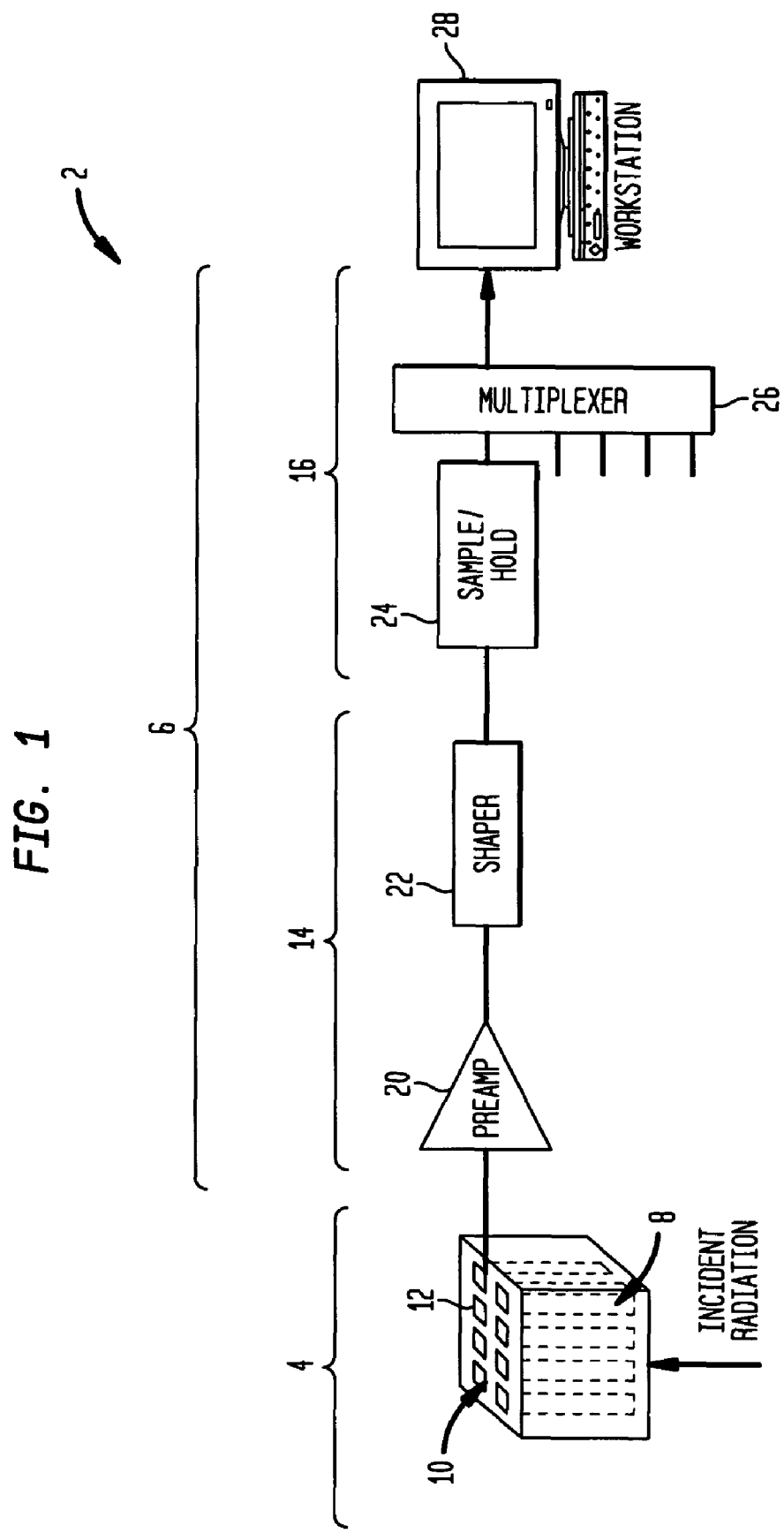
FIG. 1 is a block diagram of a radiation detection system of a type usable with the present invention.
Figure 2:
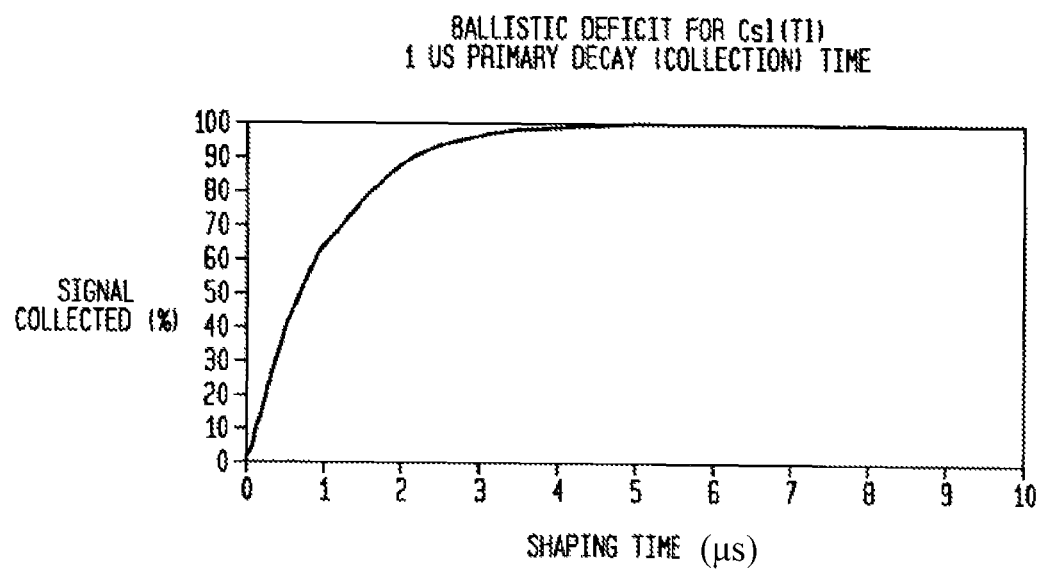
FIG. 2 is a graph of integration time versus percentage of signal collected, which shows the phenomenon of ballistic deficit.
Figure 3:
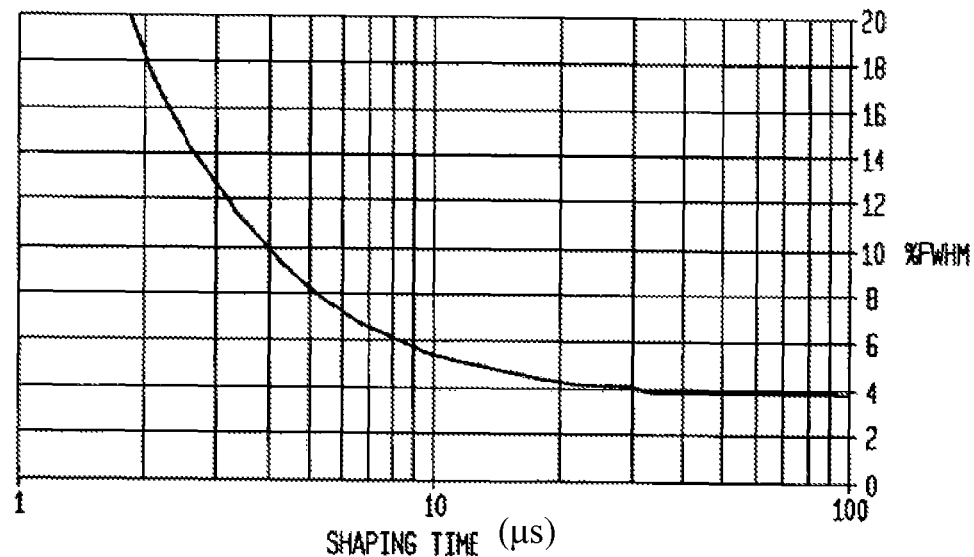
FIG. 3 is a graph of energy resolution versus integration time for a solid-state detector system applicable to the present invention.
Figure 4:
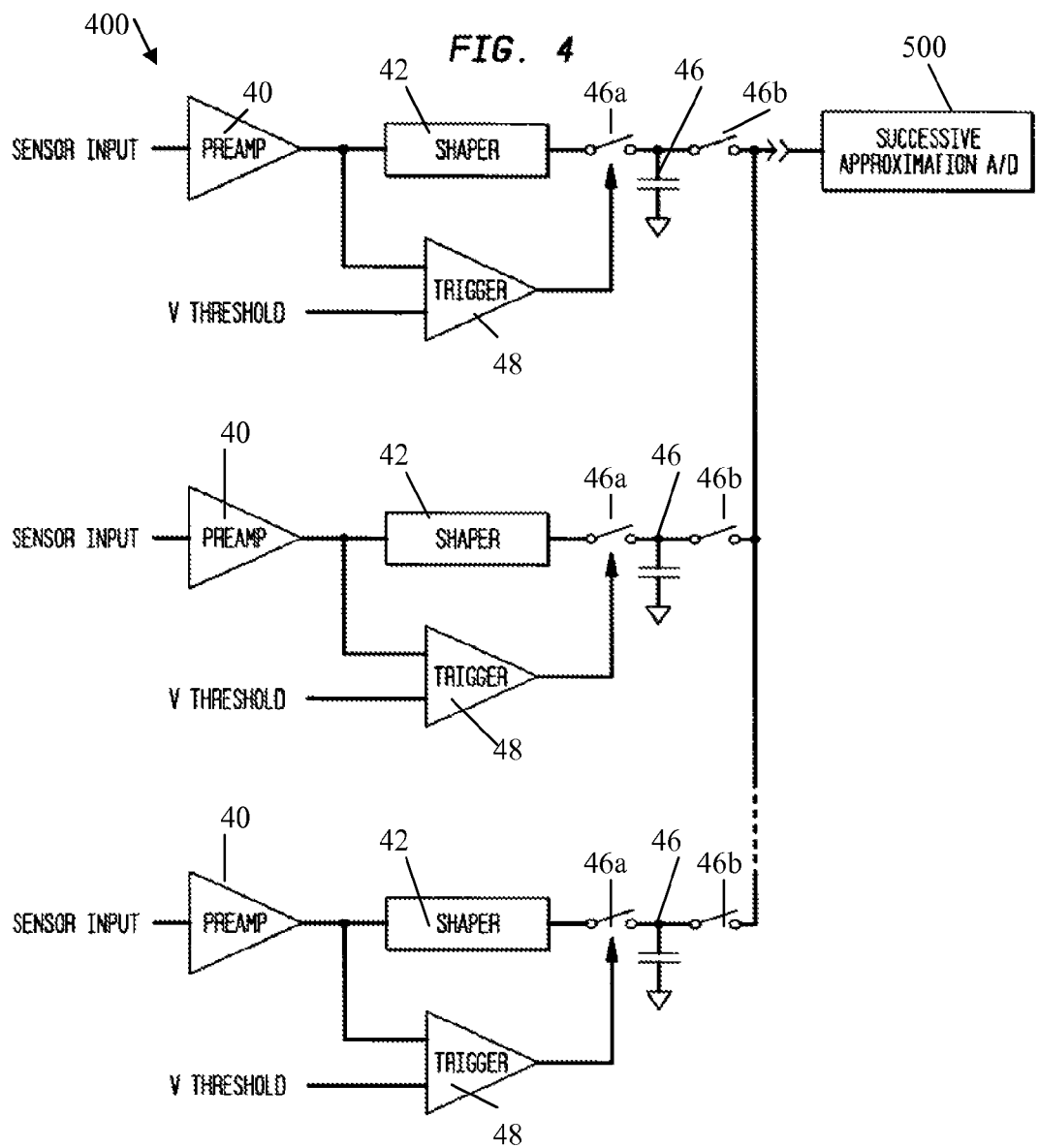
FIG. 4 is a circuit block diagram of a partitioned pipeline front-end electronics architecture according to a preferred embodiment of the present invention.

Referring to FIG. 4, a partitioned pipeline read-out circuit architecture is disclosed according to a preferred embodiment of the invention. The pipeline read-out circuit architecture eliminates real-time constraints from off-chip read-out control electronics so that an efficient decoupled architecture is possible.

The front-end electronics includes a multi-channel ASIC 400 (Application Specific Integrated Circuit) with independently triggered charge sensitive pre-amplifiers 40, shaper circuits 42, and switched sample-and-hold capacitor circuits 46 (having electronically controlled switches 46a-46b) for each photodiode or pixel of the detector module. With this structure, individual photodiodes of the photodetector array can detect and store scintillation events independently and randomly. The ASIC 400 is interfaced to an external successive approximation A/D converter 500.

The detector acquisition system according to a preferred embodiment of the invention adaptively adjusts the event-triggering energy window so as to maximize count rate performance. The system adjusts the event window by varying the reference signal V Threshold that is applied to the trigger circuits 48. At high count rates, the event window is narrowed, and at low count rates the event window is widened, such that the A/D pipeline is completely filled for each read-out cycle. This configuration results in the events being read-out in a burst mode of operation. The multi-channel ASIC 400 accumulates events in the switched sample/hold capacitors 46 independently, as they occur.

Each sample/hold circuit 46 is triggered independently by its corresponding trigger circuit 48 sending a trigger signal to switch 46a when the output of the pre-amp 40 exceeds the variable reference voltage V Threshold. During this time, the switch 46b would be in an open state, thus preventing the sample/hold capacitor from discharging its held signal to the A/D converter 500. Other sample/hold circuits 46 are free to output their event signals to the A/D converter 500 as soon as the integration of the sensor signal has been completed by the corresponding shaper circuit 42, independently of any other shaper circuit of other pixels.

The burst mode of reading out event signals thus allows efficient and economical quantization through the use of the successive approximation A/D converter 500. The present invention eliminates the constraints of the prior front-end electronics wherein new event detection is disabled during the read-out period as a consequence of, inter alia, sampling of channels having no events as a method of common mode noise estimation.

Figure 5:
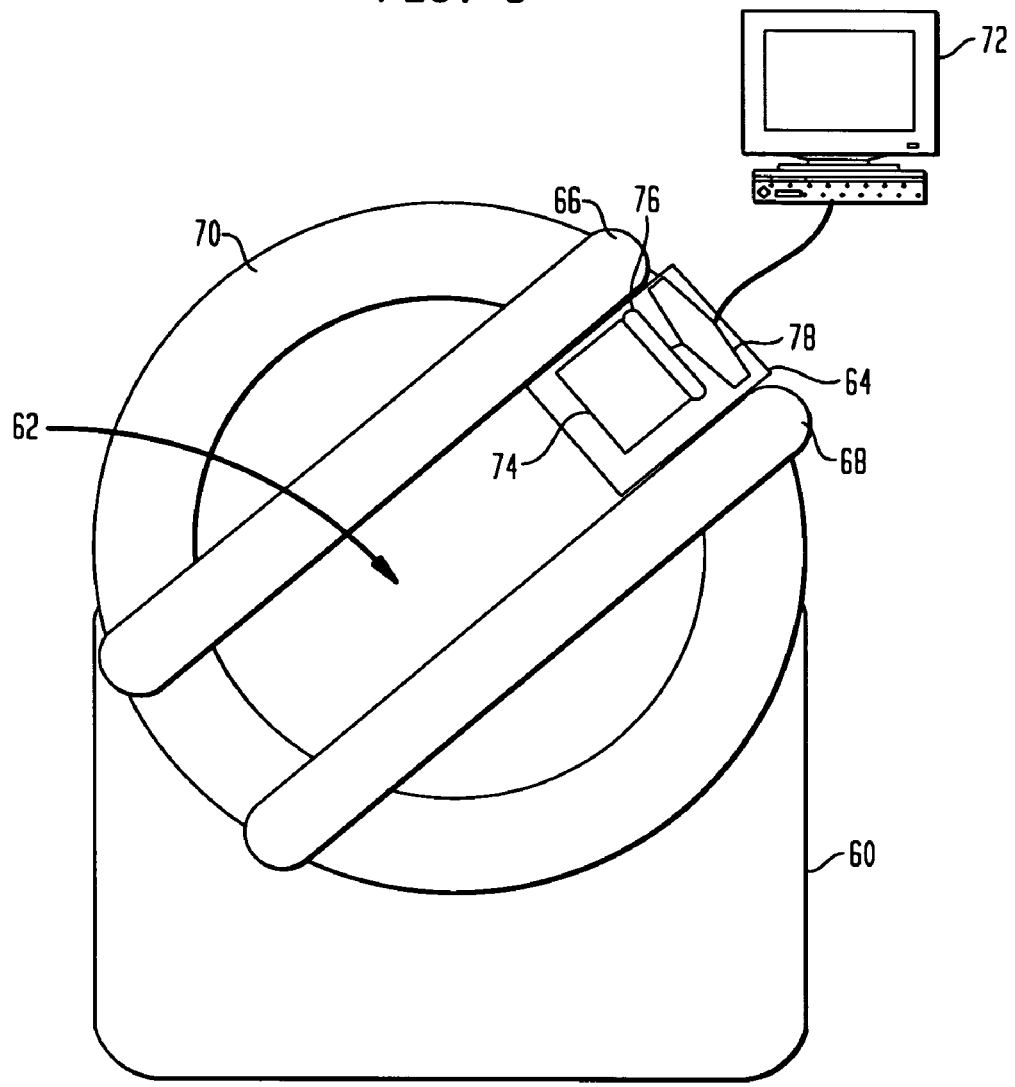
FIG. 5 is a schematic view of a radiation detection assembly for use with the pipeline front-end electronics and methods according to a preferred embodiment of the invention.

FIG. 5 is an example of an application of the low leakage current solid-state photodetector array and the improved electronics in a radiation detection assembly as might be purchased for nuclear medicine imaging in a clinical setting. The gantry 60 has an aperture 62 through which a patient may fit. The radiation detector housing 64 is mounted between tracks 66 and 68. Tracks 66 and 68 are mounted onto rotating collar 70. The radiation detector housing 64 may thus be translated along the tracks and rotated around the axis through the aperture 62. A computer 72 is in communication with radiation detector housing 64. The computer 72 is shown detached from gantry 60, but it may be integral with the gantry 60, the camera housing 64, or distributed in any manner. The radiation detector housing 64 contains a scintillator 74, a carbon-based photodiode array 76, and associated electronics 78, as described hereinabove.

The invention having been described, it will be apparent to those skilled in the art that the same may be varied in many ways without departing from the spirit and scope of the invention.

What is claimed is:

1. A radiation detector system, comprising:
   a gantry;
   a radiation detector head mounted on said gantry, said radiation detector head including a scintillator and a solid-state photodetector coupled to detect photon emissions from said scintillator;
   an electronic circuit for processing a signal outputted from said photodetector, said electronic circuit including a shaper circuit that receives said output signal from said photodetector and integrates said output signal for a predetermined amount of time to produce an integrated signal, a switched sample/hold circuit that receives a sample of said integrated signal, and a trigger circuit that triggers a switch of said sample/hold circuit to receive said integrated signal when said output signal from said photodetector exceeds a predetermined threshold;
   an A/D converter that receives sample signals from said switched sample/hold circuit and converts such signals to digital data;
   a sample/hold output switch that connects an output of said switched sample/hold circuit to said A/D converter when closed in response to completion of integration by said shaper circuit; and
   a data processing system that receives said digital data and processes it to construct radiological images of a radiation distribution detected by said radiation detector head.

2. The radiation detector system of claim 1, further comprising a pre-amplifier connected between said photodetector and said shaper circuit.

3. The radiation detector system of claim 1, wherein said solid-state photodetector comprises a photodiode.

4. The radiation detector system of claim 3, wherein said photodiode is a carbon-based photodiode.

5. The radiation detector system of claim 1, wherein said data processing system adjusts said predetermined threshold as a function of a radiation count rate of said radiation distribution.

6. The radiation detector system of claim 1, wherein said A/D converter is a successive approximation A/D converter.

7. The radiation detector system of claim 1, wherein said electronic circuit is configured as an ASIC.

8. The radiation detector system of claim 1, further comprising an array of solid-state photodetectors coupled to said scintillator, and a shaper circuit, switched sample/hold circuit, and trigger circuit associated with each solid-state photodetector of said array.

9. The radiation detector system of claim 8, wherein said array of solid-state photodetectors comprises an array of photodiodes.

10. The radiation detector system of claim 9, wherein said photodiode array is formed of carbon-based photodiodes.

11. The radiation detector system of claim 8, wherein sample signals are read out from said sample/hold circuits to said A/D converter in a burst mode as events are accumulated in said sample/hold circuits.

12. A burst-mode readout circuit for a nuclear medicine imaging apparatus having a scintillator and a plurality of photodetectors arranged to detect scintillation events in said scintillator, said burst-mode readout circuit comprising:
   a plurality of shaper circuits each associated with a respective photodetector;
   a plurality of sample/hold circuits each associated with a respective photodetector;
   a plurality of sample/hold output switches, each being coupled to an output of a respective sample/hold circuit, each of said plurality of sample/hold output switches being actuated in response to completion of an integration of an output signal of a respective photodetector by an associated shaper circuit;
   a plurality of trigger circuits each associated with a respective photodetector;
   wherein each trigger circuit compares an output signal of its associated photodetector with a preselected threshold value and outputs a trigger signal that enables a sample/ hold circuit associated with said associated photodetector to be triggered independently of other sample/hold circuits so as to receive an output signal from an associated shaper circuit only in response to a scintillation event being detected by said associated photodetector.

13. A burst-mode readout circuit as set forth in claim 12, further comprising a plurality of sample/hold input switches each coupled between an output of a respective shaper circuit and an input of an associated respective sample/hold circuit, each of said plurality of sample/hold input switches receiving a trigger signal from a respective trigger circuit.

14. A burst-mode readout circuit as set forth in claim 13, further comprising an A/D converter, each of said plurality of sample/hold output switches being further coupled to an input of said A/D converter.

15. A burst-mode readout circuit as set forth in claim 14, wherein said A/D converter comprises a successive approximation A/D converter.

16. A burst-mode readout circuit as set forth in claim 12, wherein said plurality of photodetectors comprises a plurality of carbon-based photodiodes.

17. A burst-mode readout circuit as set forth in claim 12, wherein said preselected threshold value is selected as a function of scintillation event count rate.

18. A burst-mode readout circuit as set forth in claim 12, further comprising a plurality of preamplifiers each connected between a respective photodetector and shaper circuit.

19. A burst-mode readout circuit as set forth in claim 18, wherein said plurality of preamplifiers, shaper circuits, sample/hold circuits and trigger circuits are configured as a multi-channel ASIC.

20. A nuclear medicine imaging apparatus, comprising:
a gantry;
a detector head mounted on said gantry, including a scintillator, a plurality of photodetectors arranged to detect scintillation events in said scintillator, and
a burst-mode readout circuit as set forth in claim 12.

* * * * *